United States Patent
Sethi et al.

(10) Patent No.: US 10,367,916 B2
(45) Date of Patent: Jul. 30, 2019

(54) ENHANCED FEATURE VECTOR

(71) Applicant: SAP SE, Walldorf (DE)

(72) Inventors: Raman Sethi, Fremont, CA (US); Sanjeet Mall, Pleasonton, CA (US); Juergen Schneider, Ludwigshafen (DE)

(73) Assignee: SAP SE, Walldorf (DE)

( * ) Notice: Subject to any disclaimer, the term of this patent is extended or adjusted under 35 U.S.C. 154(b) by 953 days.

(21) Appl. No.: 14/587,821

(22) Filed: Dec. 31, 2014

(65) Prior Publication Data

US 2016/0080523 A1 Mar. 17, 2016

Related U.S. Application Data

(60) Provisional application No. 62/049,886, filed on Sep. 12, 2014.

(51) Int. Cl.
*G06F 9/44* (2018.01)
*H04L 29/08* (2006.01)
*G06F 8/61* (2018.01)
*G06F 8/65* (2018.01)
*H04L 29/06* (2006.01)

(52) U.S. Cl.
CPC ............... *H04L 67/34* (2013.01); *G06F 8/63* (2013.01); *G06F 8/65* (2013.01); *H04L 67/02* (2013.01); *H04L 67/12* (2013.01); *H04L 67/125* (2013.01); *H04L 67/20* (2013.01); *H04L 67/26* (2013.01); *H04L 67/42* (2013.01)

(58) Field of Classification Search
CPC ...................................................... H04L 67/34

USPC ......................................................... 717/173
See application file for complete search history.

(56) References Cited

U.S. PATENT DOCUMENTS

| | | | | |
|---|---|---|---|---|
| 5,959,459 A * | 9/1999 | Satya | ............... | G01R 31/307 324/501 |
| 8,145,199 B2 * | 3/2012 | Tadayon | ............... | H04B 5/0062 455/418 |
| 9,430,207 B1 * | 8/2016 | Bandhole | ............... | G06F 8/38 |
| 9,434,591 B2 * | 9/2016 | Till | ............... | B67C 3/007 |
| 9,672,522 B2 * | 6/2017 | Reccek, Jr. | ............ | G06Q 30/018 |
| 2014/0298420 A1 * | 10/2014 | Barton | ............... | H04L 63/10 726/4 |

OTHER PUBLICATIONS

"Galaxy S5—Dowload Camera Modes" by Samsung, published Apr. 25, 2014 , p. 1 [online][retrieved on Nov. 3, 2017]. Retrieved from <http://www.samsung.com/ca/support/skp/faq/1042804>.*

* cited by examiner

*Primary Examiner* — Evral E Bodden
(74) *Attorney, Agent, or Firm* — Fish & Richardson P.C.

(57) ABSTRACT

The number, popularity, sophistication, etc. of mobile applications have grown dramatically with the rise of smartphones, tablets, and other such devices. Alternatives to native application development, including approaches such as hybrid application development which may employ among other things a container paradigm, inter alia address various of the drawbacks associated with native application development. A flexible, extensible, and dynamically configurable Feature Vector (FV) facility addresses one challenge with approaches such as hybrid application development—controlling an application's access to features (e.g., functions, methods, resources, etc.) and the efficient administration, management, etc. same.

20 Claims, 16 Drawing Sheets

| | | |
|---|---|---|
| API: | isFeatureEnabled | |
| Arguments: | feature | A string representing a feature (function, method, etc.). |
| | onSuccess | Callback function for True or False. |
| | onError | Callback function for error condition. |
| Example: | isFeatureEnabled ("navigator.camera", onSuccess, onError) | |

FIG. 13a

```
function checkAccelerometerFeature() {
   sap.Settings.isFeatureEnabled("navigator.accelerometer",
   function (m) {
      if (m == false) {
            console.log("accelerometer is disabled");
         } else {
                console.log("accelerometer is enabled");
            }
      },
      function () {
            console.log("Failed to get the feature list");
                                        }
      );
}
```

FIG. 13b

```
<?xml version="1.0" encoding="UTF-8"?>
<plugin xmlns="http://apache.org/cordova/ns/plugins/1.0"
    id="com.sap.mp.cordova.plugins.barcodescanner"
    version="3.4.0">
    <name>BarcodeScanner</name>
    <description>Used to scan barcode, QR codes etc.</description>
    <dependency id="com.sap.mp.cordova.plugins.corelibs" />
    <js-module name="BarcodeScanner" src="www/barcodescanner.js">
        <clobbers target="cordova.plugins.barcodeScanner"/>
    </js-module>
    <platform name="android">
    ...
    </platform>
    <platform name="ios">
    ...
    </platform>
</plugin>
```

FIG. 14

Create Feature Vector for an Application

Request:

POST https://localhost:8083/Admin/FeatureVectorPolicy/

Body:

[{"applicationID":"<APPLICATIONID>","appVersion":"1.0","name":"accelerometer","displayName":"accelerometer","id":"org.apache.cordova.accelerometer","version":"3.9","description":"Plugin for accelerometer","jsModule":"navigator.accelerometer","whitelist":""}]

Read Feature Vector for an Application

Request:

GET https://localhost:8083/Admin/FeatureVectorPolicy/<APPLICATIONID>/

Response Body :

{ { "applicationID": "<APPLICATIONID>", "appVersion": "1.0", "name": "Barcode", "displayName": "Barcode Scanner", "id": "org.apache.cordova.barcode", "version": "3.0", "description": "Plugin to scan product barcode", "jsModule": "navigator.Barcode", "whitelist": "", "lastUpdated": 1408688518472 }, { "applicationID": "<APPLICATIONID>", "appVersion": "1.0", "name": "Camera", "displayName": "Camera", "id": "org.apache.cordova.camera", "version": "3.1", "description": "Camera feature to click or read photos from the device", "jsModule": "navigator.Camera", "whitelist": "", "lastUpdated": 1408688518472 }

Update Feature Vector for an Application

Request:

PUT https://localhost:8083/Admin/FeatureVectorPolicy/

Body:

[{"applicationID":"<APPLICATIONID>","appVersion":"1.0","name":"accelerometer","displayName":"accelerometer","id":"org.apache.cordova.accelerometer","version":"3.0","description":"Plugin for accelerometer","jsModule":"navigator.accelerometer","whitelist":""}]

Delete Feature Vector for an Application

Request:

DELETE https://localhost:8083/Admin/FeatureVectorPolicy/

Body:

[{"applicationID":"<APPLICATIONID>","appVersion":"1.0","name":"accelerometer","displayName":"accelerometer","id":"org.apache.cordova.accelerometer","version":"3.0","description":"Plugin for accelerometer","jsModule":"navigator.accelerometer","whitelist":""}]

ENHANCED FEATURE VECTOR

CROSS REFERENCE TO RELATED APPLICATIONS

This application claims priority under 35 U.S.C. 119 to Provisional Application 62/049,886, filed on Sep. 12, 2014, and entitled Enhanced Feature Vector, the contents of which are incorporated herein by reference in their entirety.

TECHNICAL FIELD

This document relates generally to methods and systems for use with computer networks. More particularly, this document relates to the enhanced control of features within various classes of mobile applications.

BACKGROUND

The number, popularity, sophistication, etc. of mobile applications (applications, or simply apps) have increased dramatically with the rise of smartphones, tablets, and other such devices. It is common for these applications to be downloaded by end users from a central repository, sometimes referred to as an "app store" or other location where digital files can be downloaded to user devices. Software developers often create apps and upload these apps to such a central repository.

Apps may be designed as self-contained through a process known as native application development. One drawback to native application development is that it can become difficult to develop applications that operate on multiple different mobile platforms (cross-platform solutions), thus driving up the cost of development for apps that are intended to operate on multiple different mobile platforms.

Alternatives to native application development, including approaches such as hybrid application development which may employ among other things a container paradigm, inter alia, address various of the drawbacks associated with native application development. One challenge with approaches such as hybrid application development concerns an application's access to features (e.g., functions, methods, resources, etc.) and how one can efficiently control, manage, etc. same.

BRIEF DESCRIPTION OF DRAWINGS

The present disclosure is illustrated by way of example and not limitation in the figures of the accompanying drawings, in which like references indicate similar elements and in which:

FIG. 3 is a flow diagram illustrating a method, in accordance with an example embodiment, of operating an application update plug-in.

FIG. 4 is a flow diagram illustrating a method, in accordance with an example embodiment, of operating an application update plug-in.

FIG. 13a presents a first illustrative snippet of application source code.

FIG. 13b presents a second illustrative snippet of application source code.

FIG. 14 depicts aspects of a plugin.xml file for the Apache Cordova plug-in.

FIG. 15a illustrates a first aspect of a set of services that may be offered under an example embodiment.

FIG. 15b illustrates a second aspect of a set of services that may be offered under an example embodiment.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, for simplicity of exposition well-known instruction instances, protocols, structures, techniques, etc. have not been shown in detail.

For purposes of this disclosure, a container is a runtime environment that is inter alia executable on a mobile device within which mobile applications (or apps) can be executed. A container is a native application that is installed on the mobile device. A container may include inter alia messaging libraries, a local datastore, toolkits having a runtime from the native operating system's software development kit (SDK), etc. It may also embed a browser, which allows developers to build mobile applications using web development paradigms as opposed to traditional software development paradigms, while still maximizing the power of the native device services. This allows rapid development of mobile workflows across multiple platforms. These types of applications may extend existing enterprise business processes to, for example, a mobile device, so that business process decisions can be made on a mobile device.

In some example embodiments, a container may be designed to allow developers to create applications in open, standards-based protocols such as inter alia HyperText Markup Language (HTML) 5, JavaScript, and Cascading Style Sheets (CSS). A set of HTML files may define, etc. inter alia the app screens. A set of JavaScript files may include the methods for navigating from screen to screen and the functions for accessing data for the screens. A set of CSS files may provide the styling for the screen elements.

Figure 1:
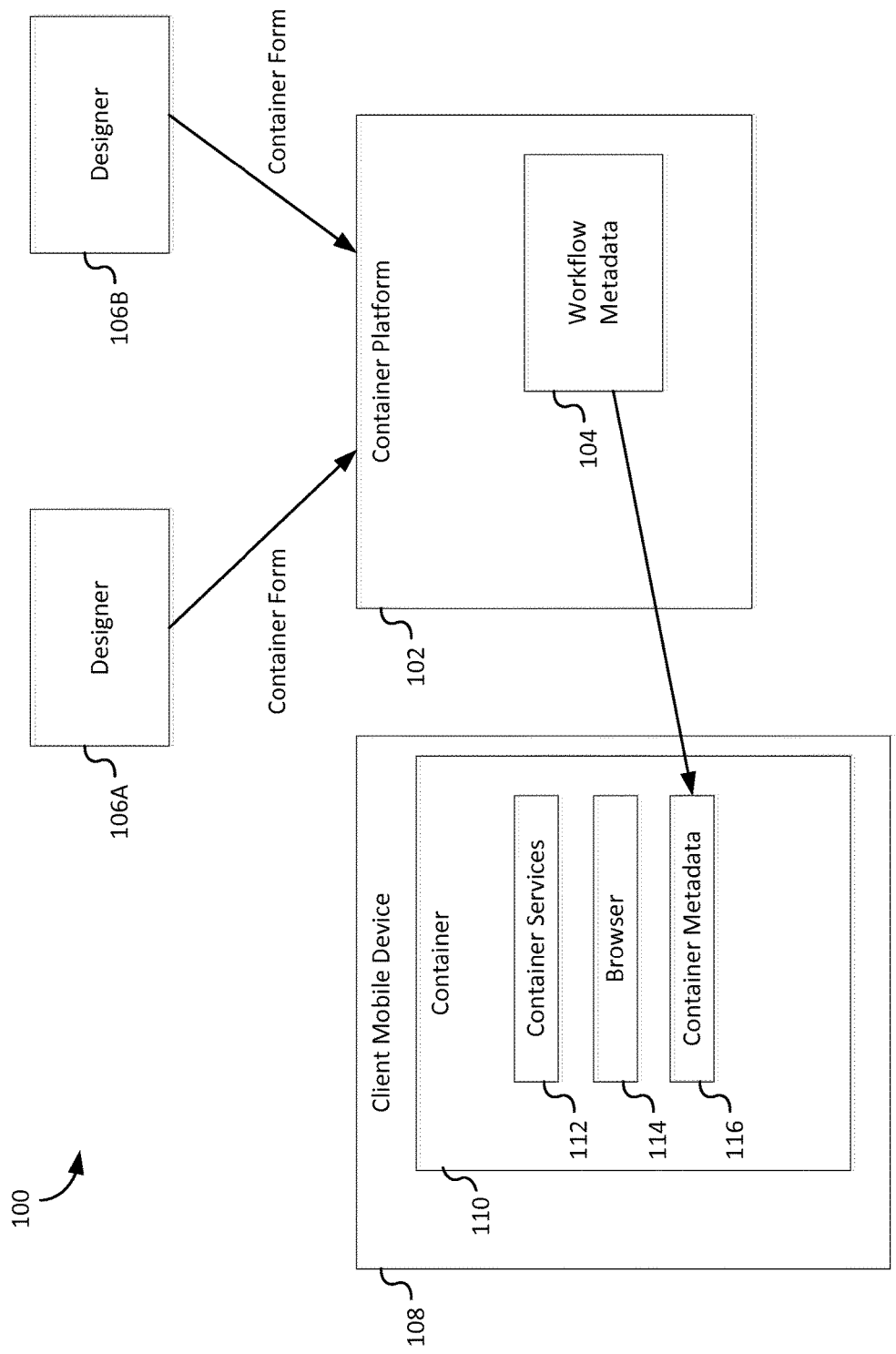
FIG. 1 is a diagram illustrating a system, in accordance with an example embodiment, to provide a container to a mobile device.

FIG. 1 is a diagram illustrating a system 100, in accordance with an example embodiment, to provide a container to a mobile device. The system 100 may include a container platform 102, which may store workflow metadata 104 obtained from one or more designers 106A, 106B. Each designer 106A, 106B may design container forms, including, for example, HTML, CSS, and JavaScript files, which may then be sent to the container platform 102 and stored as workflow metadata 104. A client mobile device 108 may then operate a container 110, which includes container services 112, a browser 114, and container metadata 116. The container services 112 may include various libraries of functions, including, for example, storage, messaging, security, provisioning functions, etc. The browser 114 may create a runtime environment using the container services 112 and the container metadata 116, which is obtained from the workflow metadata 104.

Figure 2:
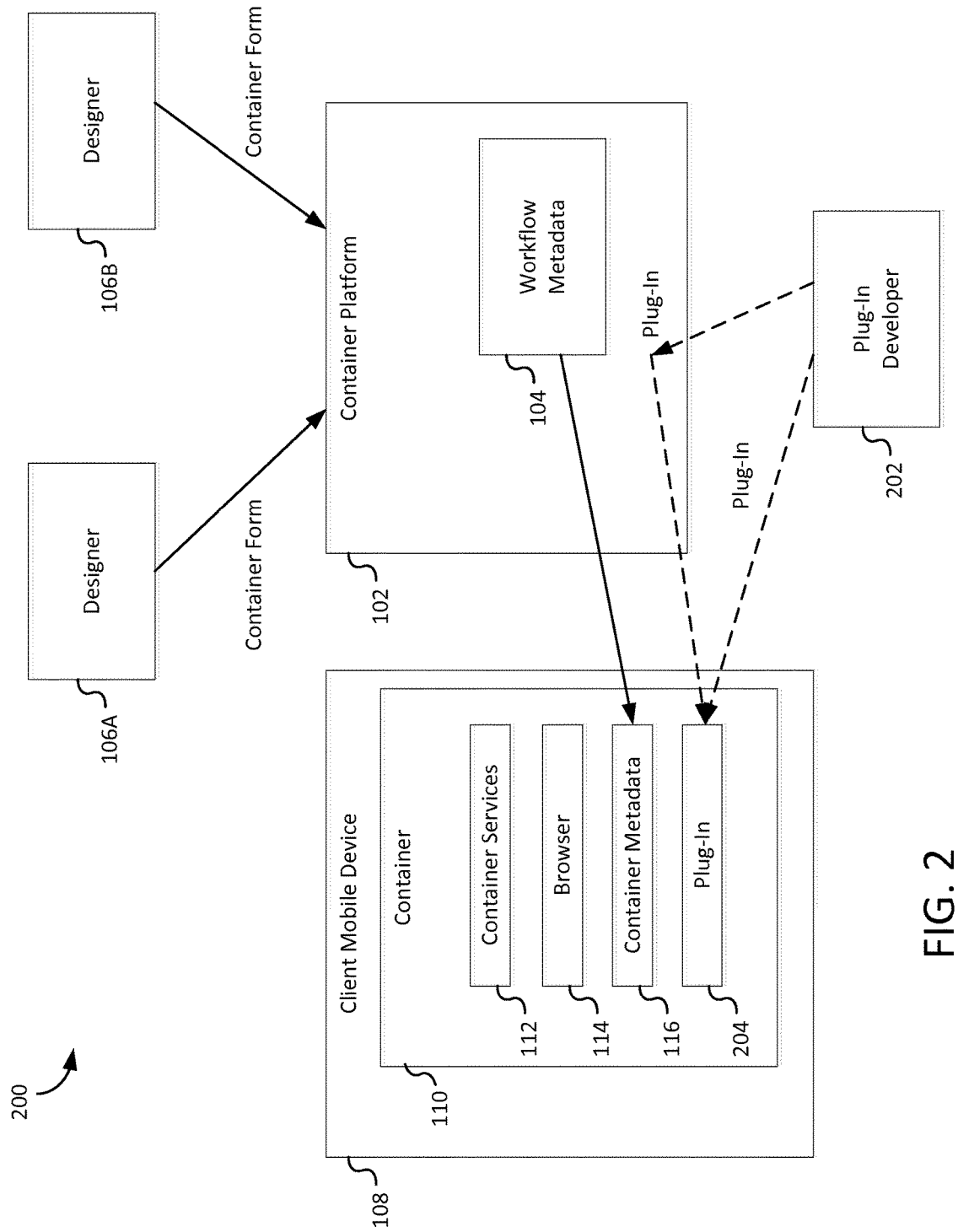
FIG. 2 is a diagram illustrating a system, in accordance with an example embodiment, to provide a plug-in to a container on a mobile device.

In an example embodiment, the container 110 may be dynamically extended or altered through the use of one or more plug-ins. FIG. 2 is a diagram illustrating a system 200, in accordance with an example embodiment, to provide a plug-in 204 to a container 110 on a mobile device. The system 200 may include the container platform 102, which may store workflow metadata 104 obtained from one or more designers 106A, 106B. The system may additionally include a plug-in developer 202. A client mobile device 108 may then operate a container 110, which includes container services 112, a plug-in 204, a browser 114, and container metadata 116. The plug-in 204 may be transmitted to the client mobile device 108 from the plug-in developer 202 via the container platform 102. In an alternative example embodiment, the plug-in developer 202 sends the plug-in directly to the client mobile device 108.

A plug-in 204 may provide functionality not available in the container services 112 that the plug-in developer 202 believes that application designers, such as designers 106A, 106B, may wish to utilize. At runtime, the browser 114 is designed to run both the container services 112 and the plug-in 204, making for a seamless experience for the user. This is accomplished without modifying the other aspects of the container 110, such as the container services 112, browser 114, and container metadata 116.

In an example embodiment, the container services 112 include JavaScript libraries that provide consistent APIs that can call the same way on any supported device. In this example embodiment, multiple plug-ins 204 are provided, including plug-ins 204 for application lifecycle management, implementation of a common logon manager, single sign-on (SSO), integrating with server-based push notifications, etc. The plug-ins 204 may utilize a configuration file of the container 110 and extend it for any settings they need for their purposes. For example, if a plug-in 204 needs to extend application configuration items such as sandboxing, application lifecycle, supportability, and so on, it may utilize additional property name fields in the configuration file.

In an example embodiment, a designer 106A, 106B may install the container services 112 and plug-ins, such as plug-in 204 on its own system, in order to be used for creating and testing the container metadata 116 prior to distribution to mobile devices, such as client mobile device 108.

The designer 106A, 106B may then set configuration parameters to configure the ultimate client devices that will run the container 110. This may include, for example, designing back-end connections for selected native and hybrid applications. This may be performed by setting fields defining whether the client device will use a system proxy, whether the client device will rewrite uniform resource locators (URLs), the maximum connections for the client device, and identifying a certificate alias of a specific certificate in the system keystone that is used when making a secure connection to the specified server. Additionally, whitelisted and/or blacklisted connections may be expanded.

A plug-in 204 may expand the universe of capabilities, services, etc. that are available to applications written in open, standards-based protocols, that operate within the container 110 without altering the container 110 or any of the other plug-ins that may reside within the container 110. Thus, such a plug-in 204 may coexist with any other plug-ins and would not impact the ability of a mobile device 108 to update aspects of the container 110, while minimizing the time required for an application designer to create the application.

Such a plug-in 204 may also make a container 110 more capable, robust, etc. by offering additional or missing features, functions, services, etc. and generally make the container 110 more enterprise-ready, among other things.

Such a plug-in 204 may also provide access to native functionality (e.g., camera, accelerometer, contact list entries) of a mobile device 108. As such, the plug-in serves as something of a bridge between the native or traditional world of mobile device applications, which would have direct access to native functionality such as the camera, and non-native applications. Such a plug-in 204 can abstract, or otherwise hide, various of the complexities associated with accessing and using this native functionality by, for example, exposing a simplified interface for it. Such a plug-in 204 may offer, among other things, enhanced security, limits on available operations, in connecting with, accessing and using native functionality.

Such a plug-in 204 may also provide various performance enhancements that can improve, among other things, the loading time of the application.

Such a plug-in 204 may also support server-controlled management (e.g. provisioning, updating, etc.) of applications as frequently required within an enterprise setting. Among other things the transfer and application of secure incremental updates, patches, etc., transparent to the user, may be supported.

Such a plug-in 204 may also support the flexible, extensible, and dynamic management of activities during any of the different phases (e.g., instantiation, startup, operation, shutdown, etc.) of the lifecycle of an application. Such a plug-in 204 may also address structural weaknesses, deficiencies, etc. that exist within a container 110, such as data access, security, the concurrent operation of multiple applications, etc. through, for example, the offering of additional, or possibly replacement, capabilities and services.

Such a plug-in 204 may comprise any combination of aspects of a publicly-available facility (such as for example Apache Cordova) and aspects of a private (e.g., custom developed) facility.

Examples of plug-ins 204 include, but are by no means limited to:

1) Logon. A logon plug-in may provide inter alia a login screen where a device user can enter values needed to connect to for example a server, such values possibly preserved in a local data vault (e.g., repository). This data vault may be separate from the one provided with other plug-ins. It also provides a way to lock and unlock the application defined by the container metadata 116, so the user can leave sensitive data open in the application.

2) Settings. A settings plug-in provides an ability to trigger an operation on a server to allow an application to store device and user settings on the client device for later use. The client device sends the server a device type, device model, whether push is enabled, and other push-related information. The settings may also use a device token received during device configuration. The server then can use this information to decide what kind of push notification to send (e.g., cloud messaging, push notification service, etc.).

3) Application Update. An application update plug-in provides server-based updates to the application content and manages the process of checking, downloading, and installing updates to the application running within the container 110. The application update plug-in may contain a series of application update methods, including, for example, an application update method that starts the application update process and triggers any required log on process, a reload application method that replaces the application resources with any newly downloaded resources and refreshes the page, an update method that forces an update check, an on update ready method that provides a handler for when an update is available, and an on login required method that provides a handler for log on.

Figure 3:
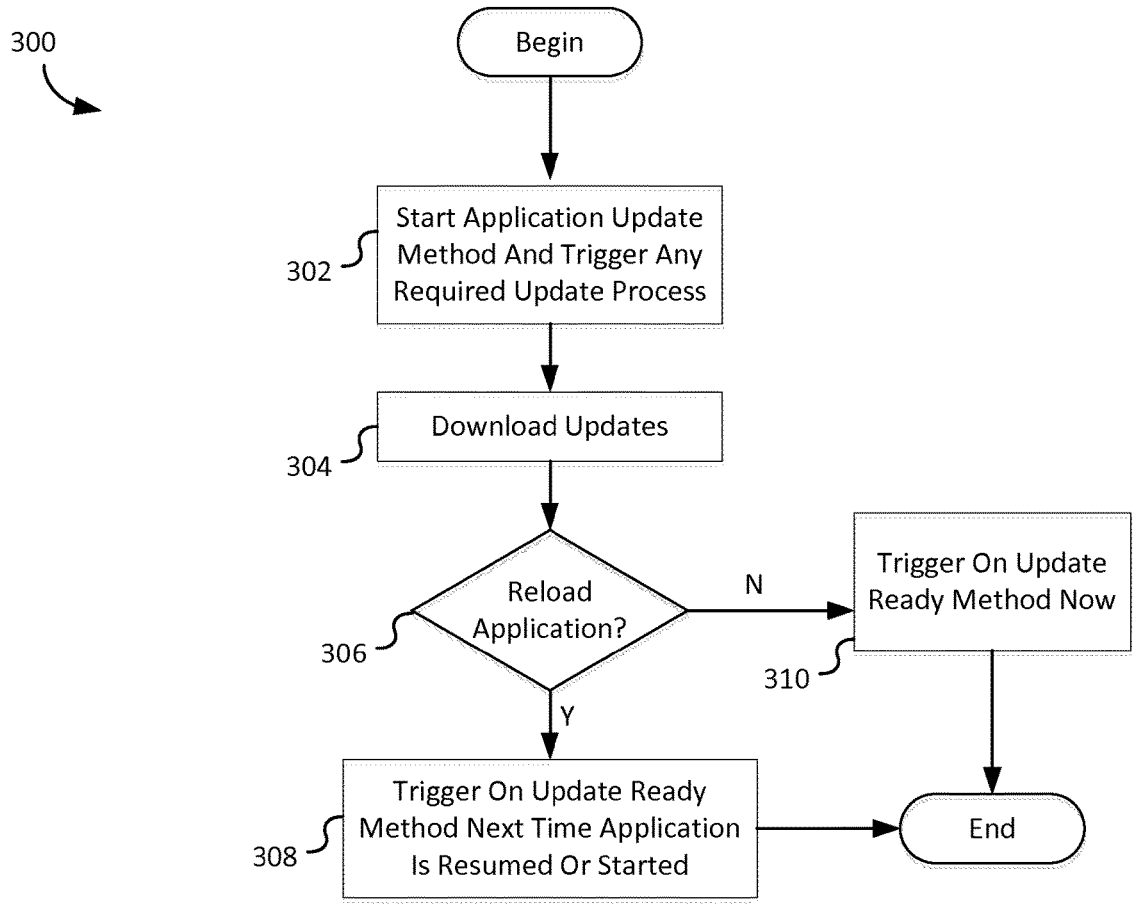

FIG. 3 is a flow diagram illustrating a method 300, in accordance with an example embodiment, of operating an application update plug-in. At operation 302, the application update method starts and triggers any needed update process. At operation 304, the updates are downloaded. At operation 306, a reload application method may ask the user to reload the application. If not, then at operation 308 the on update ready method is triggered the next time the application is resumed or started. If so, then at operation 310, the on update ready method is triggered now.

Figure 4:
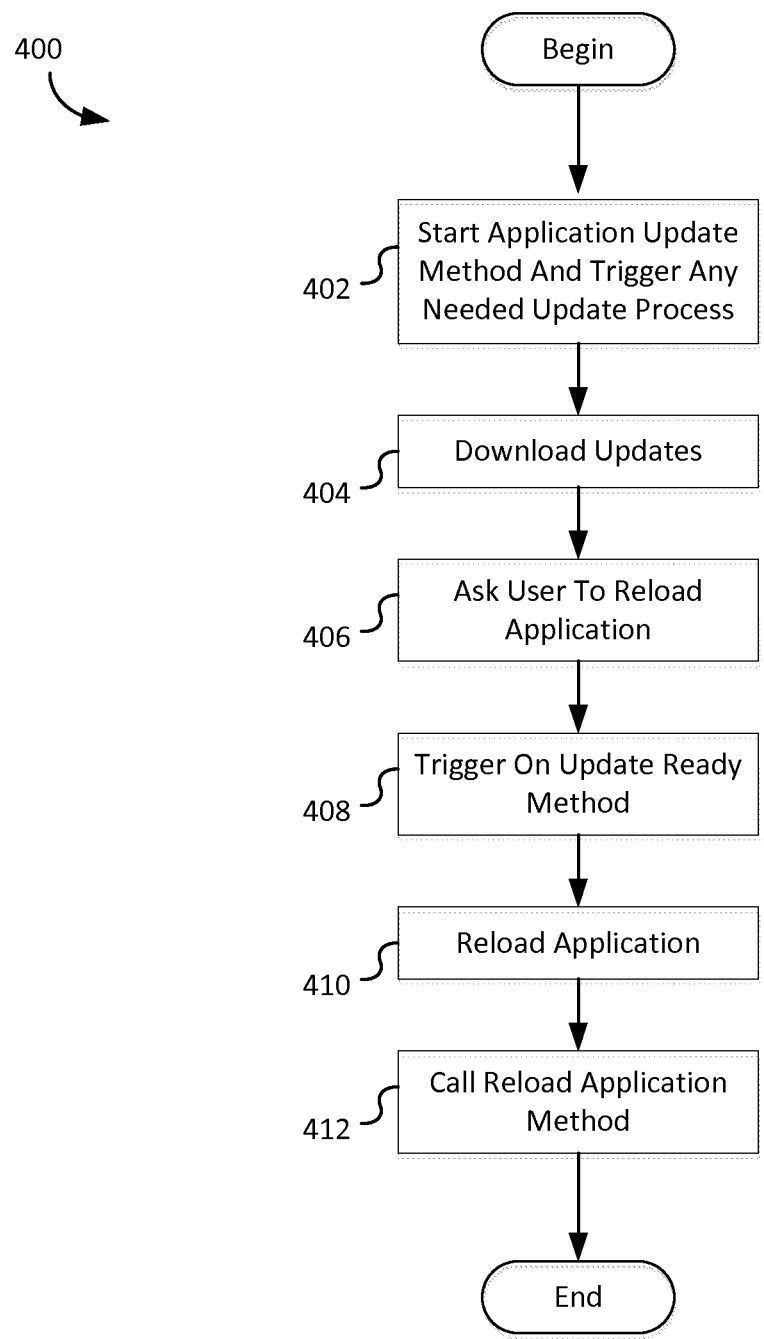

FIG. 4 is a flow diagram illustrating a method 400, in accordance with an example embodiment, of operating an application update plug-in. At operation 402, the application update method starts and triggers any needed update process. At operation 404, the updates are downloaded. At operation 406, a reload application method may ask the user to reload the application. At operation 408, the on update ready method is triggered. At operation 410, the reload application method is called and asks the user to reload the application. Then the user reloads the application. At operation 412 the reload application method is called and the updated application loads.

Updates to an application may either be full or delta. Delta updates only download and install aspects of the application that have been changed since the last update. A full update may be used when, for example, the local revision number is 0, or where the local revision number is one full number away from the server revision number (e.g., local revision number 1.2 and server revision number 2.1).

4) Authorization Proxy. An authorization proxy plug-in automates the process of accepting as Secure Socket Layer (SSL) certificates, returned by a call to a web resource. If users want certificates, such to send an Asynchronous JavaScript and Extensible Markup Language (AJAX) request, for example, to an HTTPS server and the embedded browser 116 does not support the SSL, then users could utilize the authorization proxy plug-in for this purpose.

5) Logger. A logger plug-in allows the developer to log messages, by calling one or more methods in the logger plug-in.

6) Push Notification. A push notification plug-in enables various notification capabilities for applications.

Figure 5:
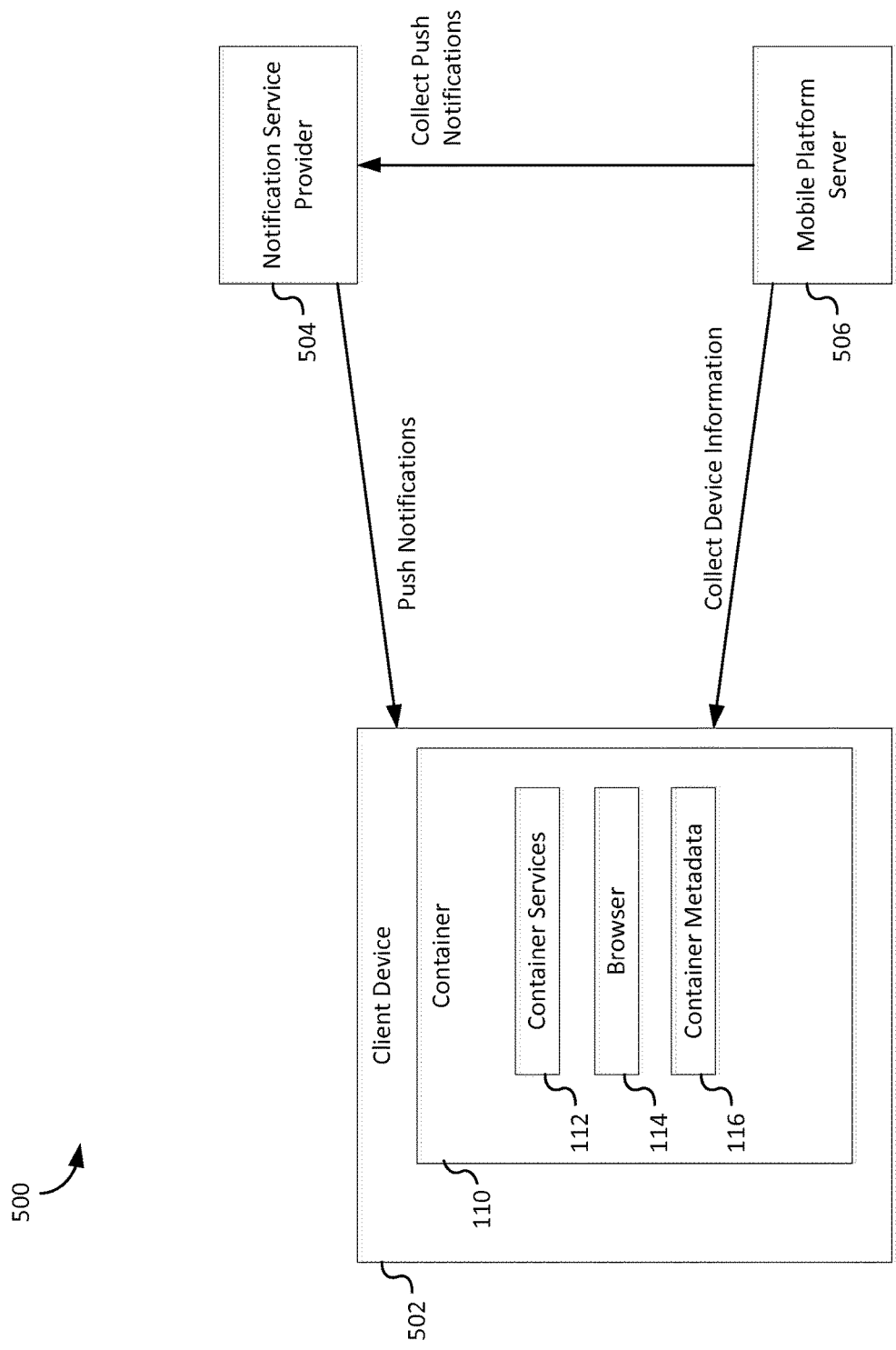
FIG. 5 is a diagram illustrating a system, in accordance with an example embodiment, of push notification.

FIG. 5 is a diagram illustrating a system, in accordance with an example embodiment, of push notification. The system includes the client device 502, running a container 110, and which receives push notifications, a notification service provider 504 that sends the push notifications, and a mobile platform server 506, which collects device identifications from the clients and push notifications through the notification service provider 504. The push notification plug-in allows developers to enroll applications for notification with notification registration, as well as to receive and process incoming notifications for applications. Such a plug-in can also support background notification processing.

Figure 6:
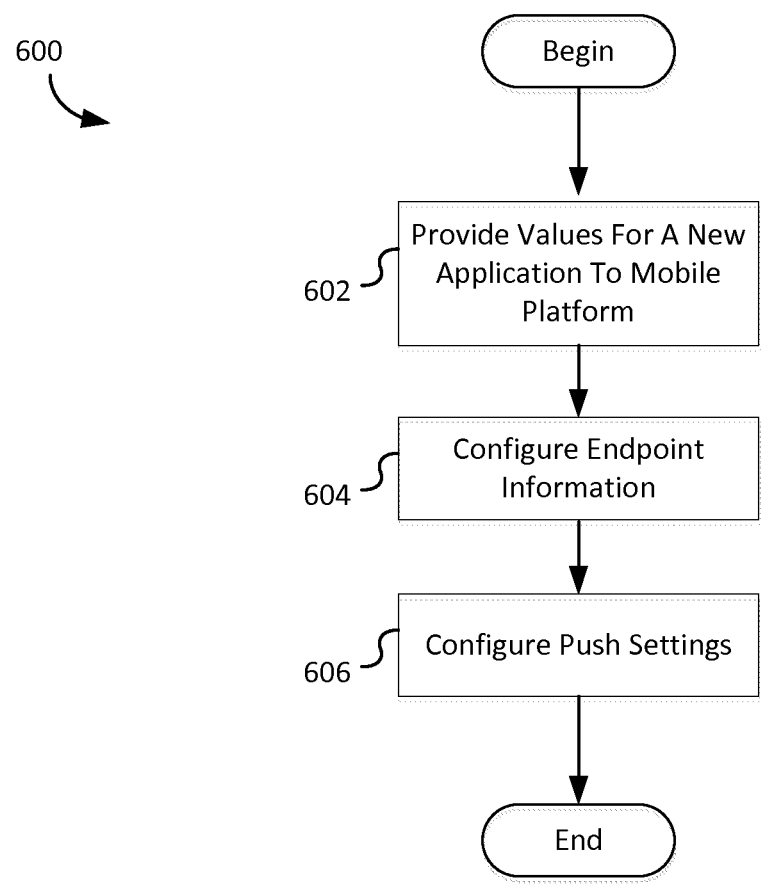
FIG. 6 is a flow diagram illustrating a method, in accordance with an example embodiment, of configuring push messaging on a mobile platform server.

FIG. 6 is a flow diagram illustrating a method 600, in accordance with an example embodiment, of configuring push messaging on a mobile platform server. This method may be performed, for example, by a designer 106A or 106B. At operation 602, values for a new application (such as for example ID, Name, Vendor, Version, Type, Description, etc.) are provided to the mobile platform. At operation 604, endpoint (e.g., provider 504) information may be configured. At operation 606, push settings may be configured.

7) Storage. A storage plug-in provides secure on-device storage. A storage plug-in may offer API methods that are asynchronous, and may include listener and callback functions.

8) Specialized. A customized plug-in that addresses any combination of one or more business, technical, etc. requirements.

Figure 7:
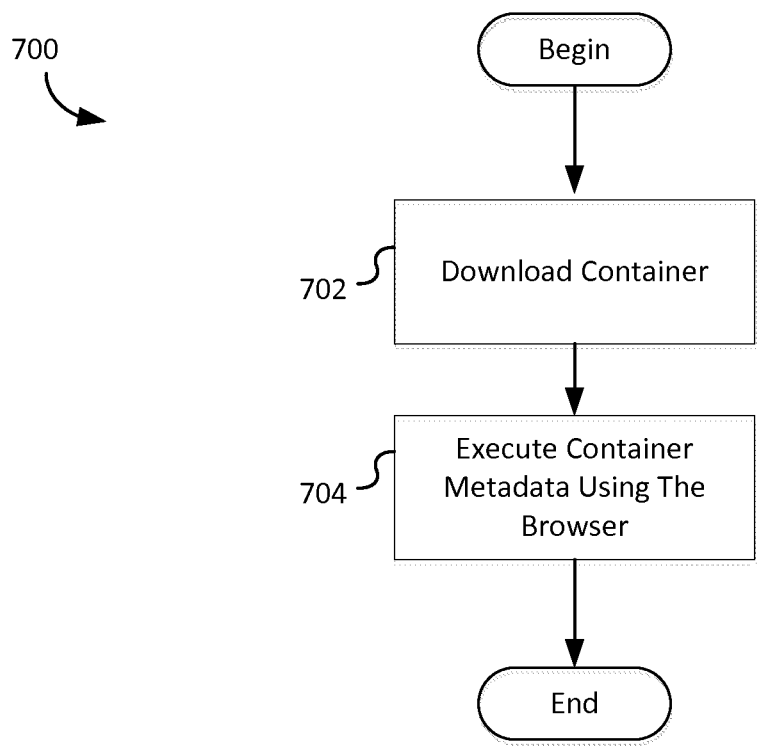
FIG. 7 is a flow diagram illustrating a method, in accordance with an example embodiment, of operating a user device.

FIG. 7 is a flow diagram illustrating a method 700, in accordance with an example embodiment, of operating a user device. At operation 702, a container 110 may be downloaded. The container 110 may be an application natively executable by a first operating system of the user device. The container 110 may include a container service 112 including one or more libraries of functions designed by a container 110 designer 106A and 106B to natively operate on the first operating system. The container 110 may also include a browser 116. The container 110 may also include container metadata 118 defining functions of the application, the functions compatible with the container service 112 for the first operating system and also compatible with a container service 112 for a second operating system. The container 110 may also include a plug-in 204 including one or more additional libraries of functions designed by an entity other than the container 110 designer 106A and 106B to perform additional native operations on the first operating system. At operation 704, the container metadata 116 may be executed using the browser 114, causing function calls to the container service 112 and plug-in 204 and thus controlling native functions of the user device.

Figure 8:
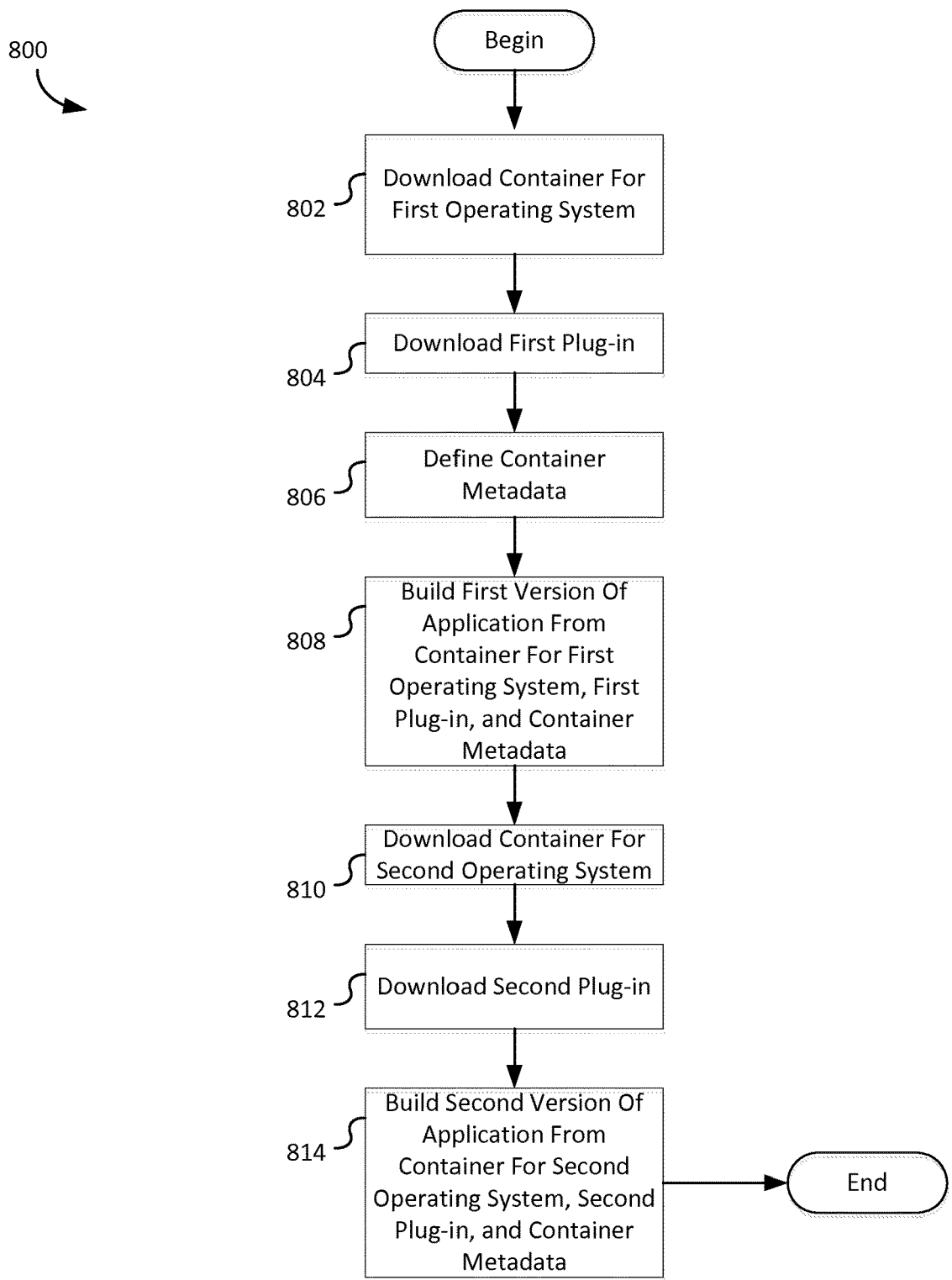
FIG. 8 is a flow diagram illustrating a method of designing an application to be executed on user devices having different operating system.

FIG. 8 is a flow diagram illustrating a method 800 of designing an application to be executed on user devices having different operating systems. At operation 802, a container 110 for a first operating system may be downloaded. The container 110 may include a container service 112 including one or more libraries of functions designed by a container 110 designer 106A and 106B to natively operate on the first operating system, and a browser 114. At operation 804, a first plug-in 204 is downloaded. The first plug-in 204 may include one or more additional libraries of functions designed by an entity other than the container 110 designer 106A and 106B to perform additional native operations on the first operating system.

At operation 806, container metadata 116 specifying functions on the application and containing calls to the libraries in the container service 112 for the first operating system and the first plug-in 204 is defined. At operation 808, a first version of the application is built from the container 110 for the first operating system, the first plug-in 204, and the container metadata 116.

At operation 810, a container 110 for a second operating system is downloaded. The container 110 for the second operating system may include a container service 112 including one or more libraries of functions designed by the container 110 designer 106A and 106B to natively operating on the second operating system, and a browser 114. At operation 812, a second plug-in 204 is downloaded, the second plug-in 204 including one or more additional libraries of functions designed by an entity other than the container 110 designer 106A and 106B to perform additional native operations on the second operating system. At operation 814, a second version of the application is built from the container 110 for the second operating system, the second plug-in 204, and the container metadata 116.

As described above, the universe of containers, browsers, plug-ins, etc. provides for a rich mobile application environment. For reasons of security, control, corporate policy, etc. a flexible, extensible, and dynamically configurable Feature Vector (FV) facility provides for the efficient management of access to possibly among other things the features (e.g., functions, methods, etc.) that may for example be exposed through inter alia a (plug-in, container, etc.) API.

In brief, a FV identifies for an app the particular features (e.g., functions, methods, etc.) that are to be disabled for, that is are not to be available to, the app.

For example, for security, corporate policy, profile, preference, etc. reasons it may be necessary to preclude a particular app from being able to access certain native capabilities of a device such as for example a camera, an accelerometer, etc. In such cases a FV may be created that identifies those exclusions.

An administrator (at for example an app store, within a corporate network environment, in an app development setting, etc.) may among other things define, manage, etc. a FV for an app.

Figure 11:
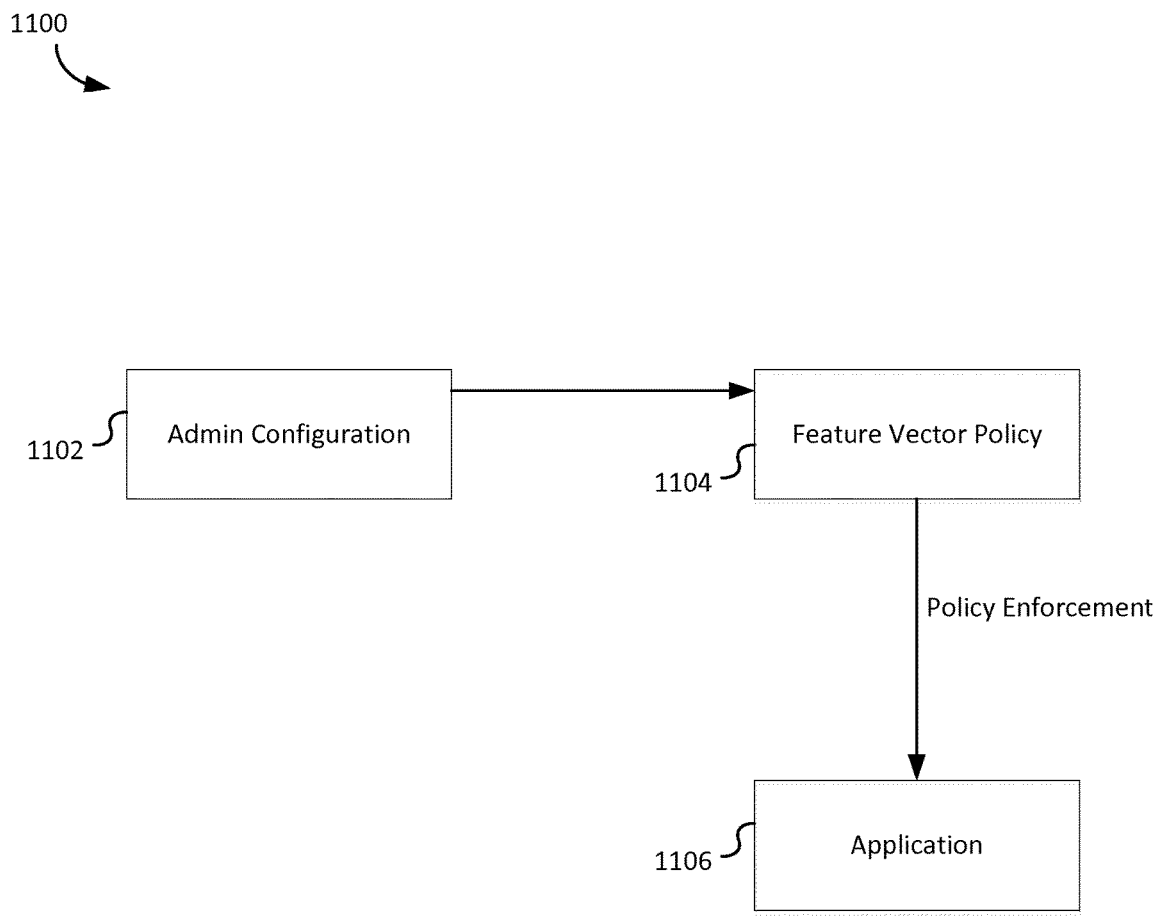
FIG. 11 is a high-level flow diagram illustrating aspects of an example embodiment.
Figure 12:
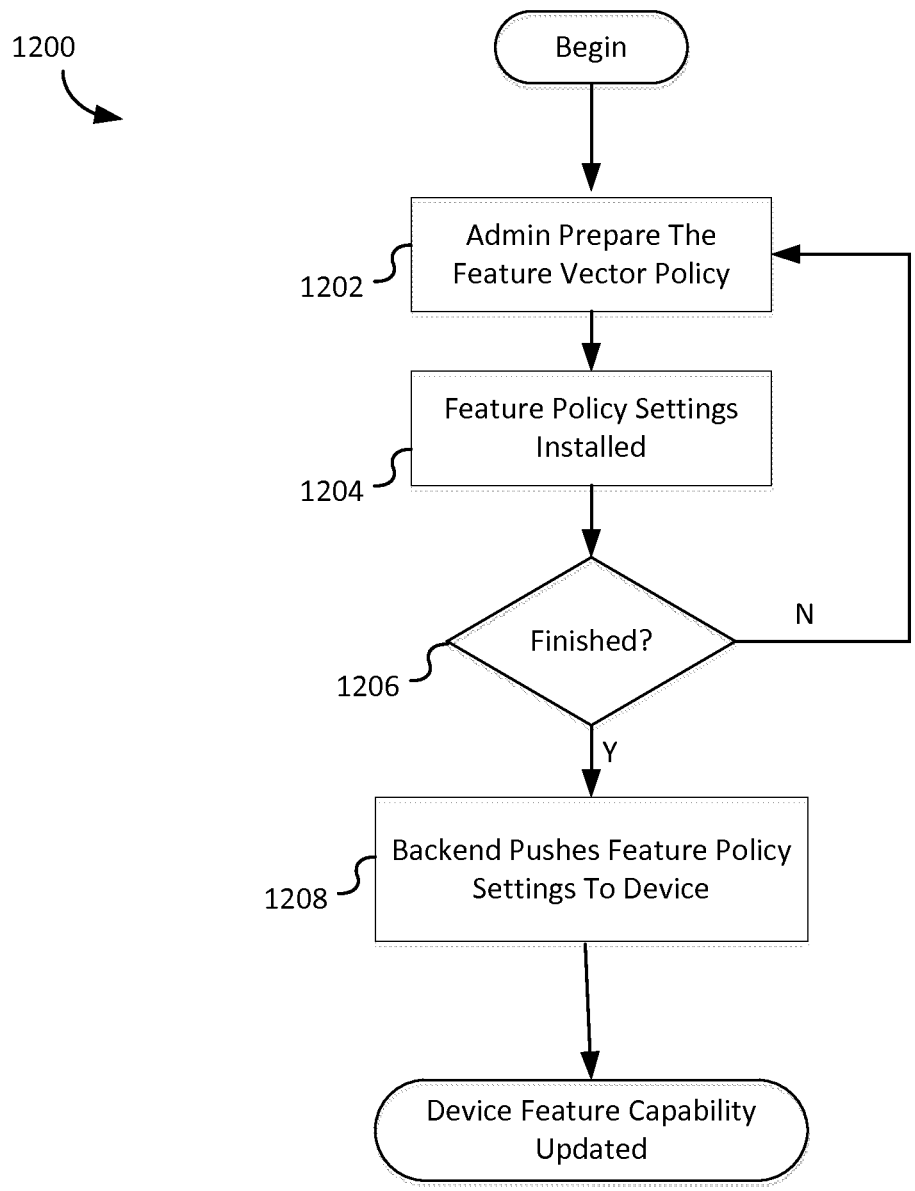
FIG. 12 is a flow diagram illustrating aspects of the operation of an example embodiment.

FIG. 11 and FIG. 12 illustrate, conceptually and at a high level, aspects of such a process.

For purposes of illustration, and as just one possible example, FIG. 14 depicts a portion of a plugin.xml file for the Apache Cordova plug-in and FIGS. 15a and 15b illustrate aspects of a set of Representational State Transfer (REST)-based functions, methods, services, etc. that may be provided to an administrator in support of inter alia standard CRUD operations on/for FVs:

1) Create. The ability to create or define a new FV for an application (<ApplicationID> in the instant example in FIG. 15a).

2) Read. The ability to read or get a previously-defined FV for an application (<ApplicationID> in the instant example in FIG. 15a).

3) Update. The ability to update or change a previously-defined FV for an application (<ApplicationID> in the instant example in FIG. 15b).

4) Delete. The ability to delete or remove a previously-defined FV for an application (<ApplicationID> in the instant example in FIG. 15b).

An administrator may make use of any combination of one or more channels (including for example a GUI, APIs, command line interfaces, manual inputs, etc.) to view, manage, etc. a FV (through, as just one example, the REST-based functions, methods, etc. that were just described).

Any number of facilities (including inter alia version control, check-in/check-out mechanisms, audit trails, etc.) may be provided in support of an administrator carrying out her activities.

After a FV is created it may inter alia be stored with, reside with, etc. an app in/at for example an app store, a corporate network environment (e.g., an intranet), on the Internet, etc.

A FV may be conveyed to a device at any number of points or times during an application's lifecycle—e.g., during any combination of one or more of when downloaded, when installed, when updated, when invoked, when a user logs in, when resuming from a sleep/idle state, when a user changes physical location, when the FV is changed/updated, etc.—using any combination of push and/or pull mechanisms.

During FV conveyance any number of techniques, mechanisms, etc. (including inter alia recovery checkpoints, compression, checksums, chunking, etc.) may be employed to among other things improve performance, increase efficiency, etc. Additionally, during FV conveyance any number of techniques, mechanisms, etc. (including inter alia encryption, etc.) may be employed to among other things enhance security.

When a FV is received by a device it may among other things be processed, parsed, validated, etc. and inter alia aspects of same may be preserved in a local repository (e.g., a data vault). Access to such a repository (by, for example, apps) may be secured in any number of ways.

One or more function, methods, etc. may be made available to an app that inter alia query the local repository for relevant FV details and identify to the app among other things whether a specific feature (function, method, etc.), based on inter alia FV settings, is enabled or available.

For purposes of illustration, one such function, method, etc.—isFeatureEnabled—is presented in FIG. 13a.

In FIG. 13b a snippet of application source code illustrates one way in which an app may invoke a isFeatureEnabled function, method, etc. to determine whether a specific feature (e.g., function, method, etc.)—"navigator.accelerometer" in the instant case—is enabled or available.

A FV may incorporate any number of elements, values, components, structures, etc. (see for example FIGS. 15a and 15b for one set of examples) including inter alia identifiers, descriptive text (such as for example name, description, title, etc.), blacklist and/or whitelist entries, Quality of Service designations, priority levels, resources other than just functions/methods/etc., date/time stamps capturing lifecycle events (creation, update, etc.), FV and/or app version information, device user location information (triggers, etc.), wildcard characters, regular expressions, rules, code (JavaScript, etc.) references, etc.

A FV may be preserved (at a server, on a device, etc.) in any number of ways including for example any combination of conventional Relational Database Management Systems (RDBMSs), Object Database Management Systems (ODBMSs), in-memory Database Management Systems (DBMSs), data structures, flat files, memory constructs, etc.

One or more special attributes may be defined. For example, for improved efficiency a Settings.AllFeaturesEnabled attribute may, when for example set to True, indicate that all features (e.g., functions, methods, etc.) are enabled or available, obviating for example the need for an app to make multiple individual calls to a isFeatureEnabled function, method, etc.

For simplicity of exposition in the above discussion an app was described as having a (i.e., one) FV. However, it will be readily apparent to one of ordinary skill in the art that it is easily possible for an application to optionally have multiple FVs, with such FVs named in different ways and organized in any number ways (e.g., unordered, sequential, hierarchical, etc.).

Figure 9:
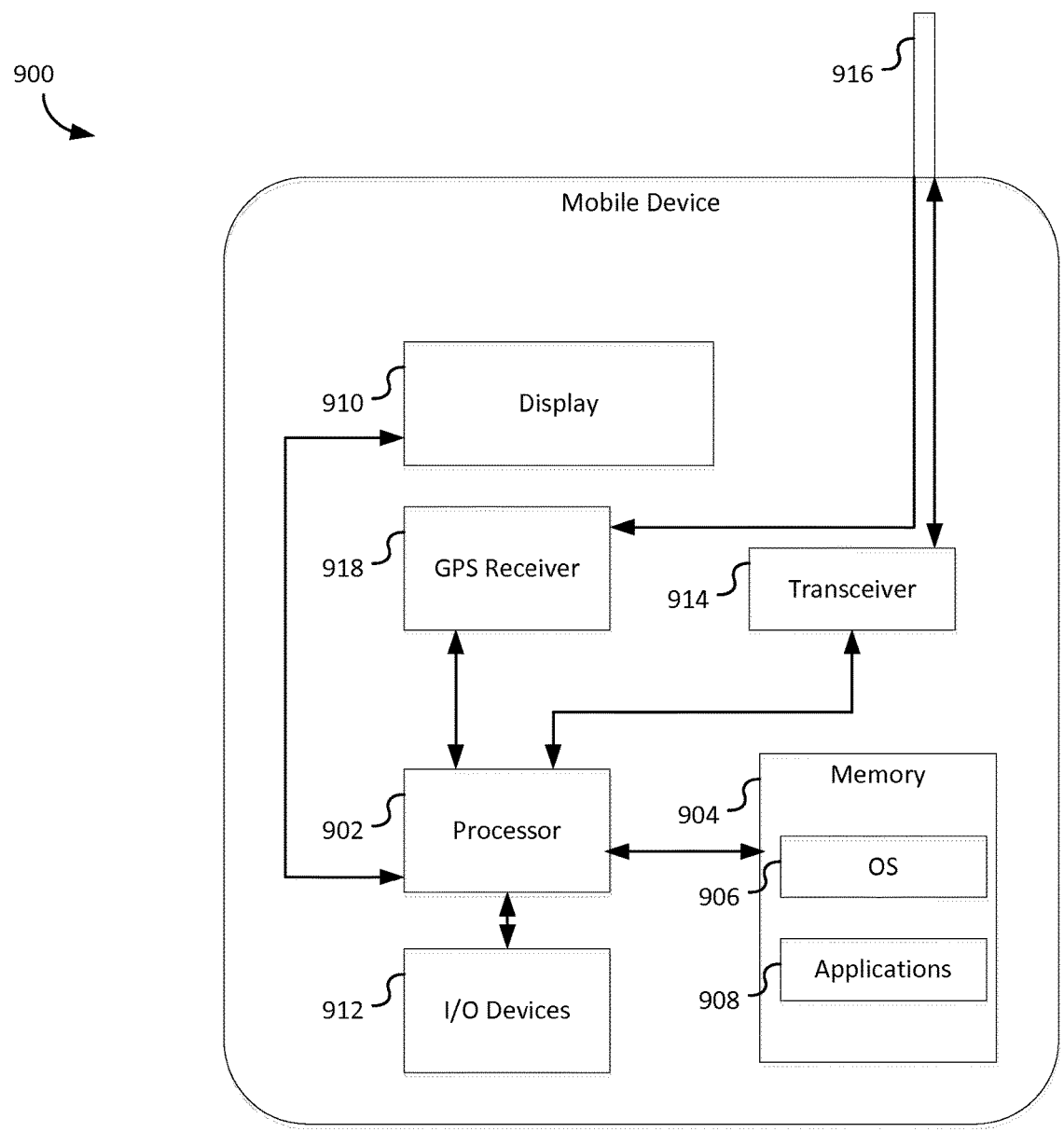
FIG. 9 is a block diagram illustrating a mobile device, according to an example embodiment.

FIG. 9 is a block diagram illustrating a mobile device 900, according to an example embodiment. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or other type of memory, is typically accessible to the processor 902. The memory 904 may be adapted to store an operating system (OS) 906, as well as application programs 908, such as a mobile location enabled application that may provide LBSs to a user. The processor 902 may be coupled, either directly or via appropriate intermediary hardware, to a display 9010 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive GPS signals.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 902 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 902 or other programmable processor 902) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 902 configured using software, the general-purpose processor 902 may be configured as respective different hardware-implemented modules at different times. Software may accordingly configure a processor 902, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors 902 or processor-implemented modules. The performance of certain of the operations may be distributed among the one or more processors 902, not only residing within a single machine, but deployed across a number of machines. In some example embodiments, the processor 902 or processors 902 may be located in a single location (e.g., within a home environment, an office environment or as a server farm), while in other embodiments the processors 902 may be distributed across a number of locations.

The one or more processors 902 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 902, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 902 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other.

In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 902), or a combination of permanently and temporarily configured hardware may be a design choice. Below are set out hardware (e.g., machine) and software architectures that may be deployed, in various example embodiments.

Figure 10:
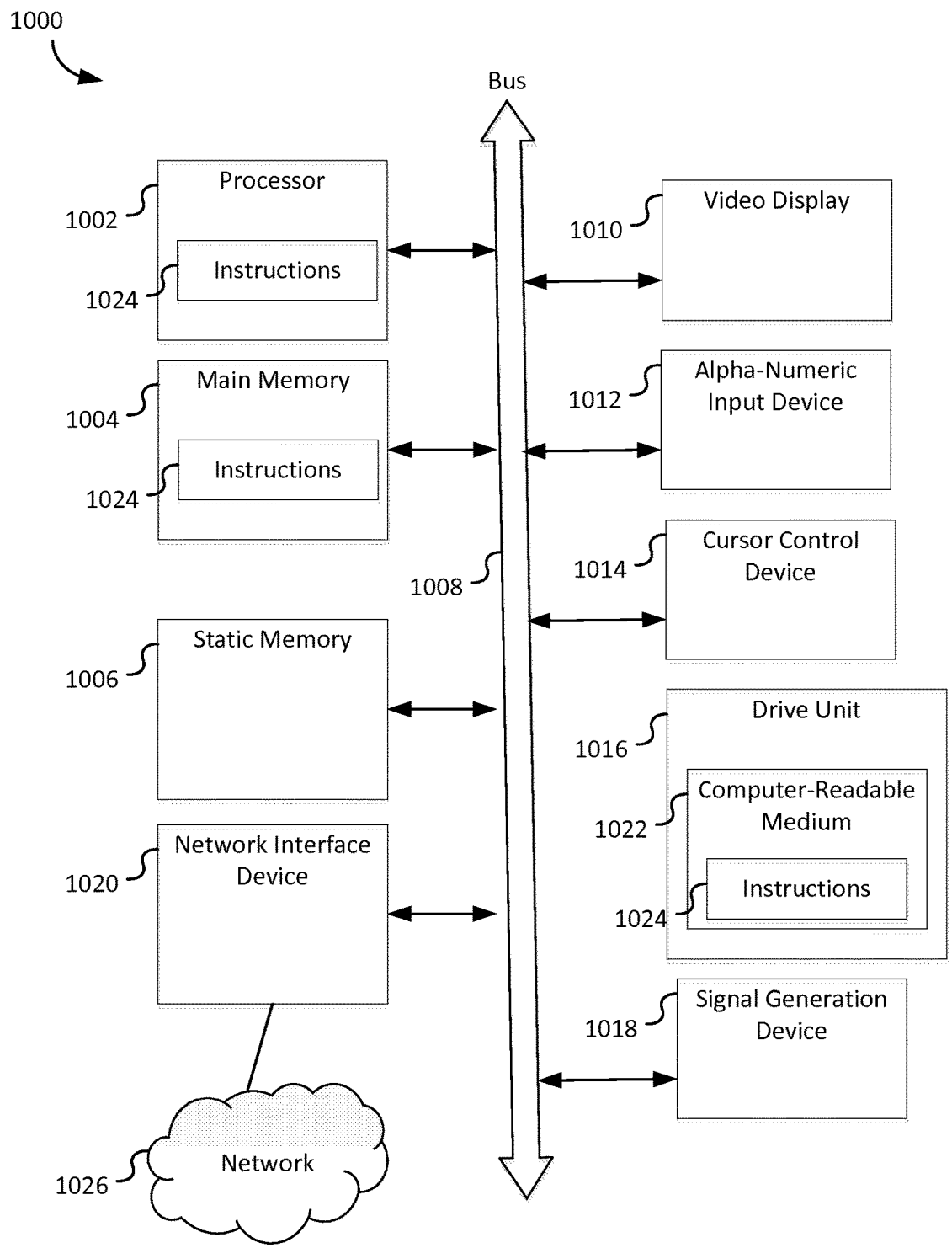
FIG. 10 is a block diagram of machine in the example form of a computer system within which instructions, for causing the machine to perform any one or more of the methodologies discussed herein, may be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both, a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions 1024 for execution by the machine and that cause the machine to perform any one or more of the methodologies of the present disclosure or that is capable of storing, encoding or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

By way of example of a method in accordance with the above description, such a method for controlling access by an application to features on a client device may include receiving, from a server, a Feature Vector (FV) for the application. Such a method may further include processing aspects of the FV including at least preserving a portion of the FV in a local repository, and returning to the application an indicia of the availability of a feature by at least querying the local repository.

What is claimed is:

1. A method for controlling access by an application to features on a client device, the method comprising:
   receiving, from a server, a Feature Vector (FV) that particularly corresponds to the application, the FV listing one or more of the features on the client device that are to be unavailable to the application while the application executes, on the client device, in a container that has been extended through use of at least one plug-in that is particularly configured to provide the application access to one or more native functionality features on the client device;
   processing aspects of the FV including storing at least a portion of the FV in a local repository on the client device;
   accessing the stored portion of the FV in the local repository to determine an availability of a particular native functionality feature of the one or more native functionality features that are accessible to the application through the at least one plug-in; and
   providing to the application an indicia of the availability of the particular native functionality feature based on determining that the particular native functionality feature is not listed in the stored portion of the FV.

2. The method of claim 1, wherein the server is configured to store the FV together with the application within an application repository, prior to a downloading of the FV and application to the client device.

3. The method of claim 1, wherein the receiving the FV for the application comprises downloading the FV to the client device in conjunction with at least one of a download, installation, update, or modification of the application at the client device.

4. The method of claim 1, wherein the receiving the FV for the application comprises downloading the FV to the client device when the FV is invoked or modified.

5. The method of claim 1, wherein the receiving the FV for the application comprises downloading the FV to the client device in response to a change event for the client device, the change event including at least one of a log-in of a user, a change between a sleep/idle/active state of the client device, or a change in a physical location of the client device.

6. The method of claim 1, wherein the FV specifies the availability of the feature based on at least one of a security policy or a corporate policy.

7. The method of claim 1, wherein the feature includes a native hardware feature of the client device.

8. The method of claim 7, wherein the native hardware feature includes at least one of a camera and an accelerometer.

9. The method of claim 1, wherein the processing aspects of the FV include validating the FV and the local repository includes a secure data vault.

10. The method of claim 1, wherein the providing to the application an indicia of the availability of the feature comprises:
    receiving a request from the application to check whether the feature is enabled;
    querying the local repository to obtain a corresponding attribute for the feature; and
    returning the indicia of the availability of the feature, the indicia including a communication that the feature is enabled.

11. The method of claim 10, wherein the FV governs application features, including the feature, exposed through an Application Program Interface (API) for a plug-in for the application.

12. A computer program product, the computer program product being tangibly embodied on a non-transitory computer-readable storage medium and comprising instructions that, when executed, are configured to cause at least one processor to:
    receive a Feature Vector (FV) that particularly corresponds to an application, the FV listing one or more features on a client device that are to be unavailable to the application while the application executes, on the client device, in a container that has been extended through use of at least one plug-in that is particularly configured to provide the application access to one or more native functionality features on the client device;
    store at least a portion of the FV in a local repository on the client device;
    receive a request from the application to access a particular feature on the client device;
    access the stored portion of the FV in the local repository to determine an availability of the particular native functionality feature of the one or more native functionality features that are accessible to the application through the at least one plug-in; and
    providing to the application an indicia of the availability of the particular native functionality feature, based on determining that the particular native functionality feature is not listed in the stored portion of the FV.

13. The computer program product of claim 12, wherein the FV and the application are downloaded from a server, and the server is configured to store the FV together with the application within an application repository, prior to the downloading of the FV and application to the client device.

14. The computer program product of claim 12, wherein the feature includes a native hardware feature of the client device.

15. The computer program product of claim 12, wherein the FV indicates whether the feature is available based on a platform being run by the client device.

16. The computer program product of claim 12, wherein the client device is a mobile device including the container for executing the application, and the FV governs application features, including the feature, exposed through an Application Program Interface (API) for a plug-in of the container.

17. A computer program product, the computer program product being tangibly embodied on a non-transitory computer-readable storage medium and comprising instructions that, when executed, are configured to cause at least one processor to:

provide a Feature Vector (FV) for administering an application repository that includes an application that executes, on a client device, in a container that has been extended through use of at least one plug-in that is particularly configured to provide the application access to one or more native functionality features of the client device, the FV including access controls for access by the application to the features of the client device, the FV listing one or more of the features of the client device that are to be unavailable to the application while the application executes, on the client device, in the container;

perform Create/Read/Update/Delete (CRUD) operations on the FV, including storing at least a portion of the FV in a local repository on the client device;

access the stored portion of the FV in the local repository to determine an availability of a particular native functionality feature of the one or more native functionality features that are accessible to the application through the at least one plug-in;

providing to the application an indicia of the availability of the particular native functionality feature based on determining that the particular native functionality feature is not listed in the stored portion of the FV.

18. The computer program product of claim 17, wherein the FV is provided in conjunction with at least one of a security policy or a corporate policy governing the access of the application to at least one of the features.

19. The computer program product of claim 17, wherein at least one of the features includes a native hardware feature of the client device.

20. The computer program product of claim 17, wherein the CRUD operations are performed through Representational State Transfer (REST) based functions.

* * * * *